Dec. 27, 1949  R. A. BECK ET AL  2,492,349
CARRYING OUT CATALYTIC REACTIONS
Filed Nov. 26, 1946
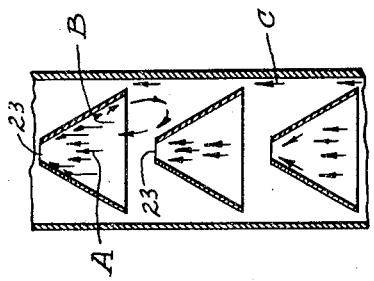
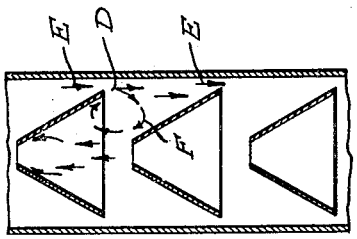
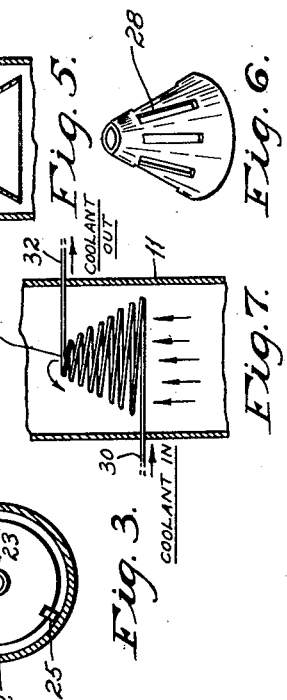
INVENTORS
ROLAND A. BECK
EUGENE E. SENSEL
BY
ATTORNEY Patented Dec. 27, 1949

2,492,349

UNITED STATES PATENT OFFICE 2,492,349

CARRYING OUT CATALYTIC REACTIONS

Roland A. Beck, Fishkill, and Eugene E. Sensel, Beacon, N. Y., assignors to The Texas Company, New York, N. Y., a corporation of Delaware Application November 26, 1946, Serial No. 712,410

6 Claims. (Cl. 260—449.6)

1

The present invention relates to catalytic reactions wherein one or more fluid reactants are passed in contact with a solid particulate catalyst and more particularly is concerned with reactions wherein predetermined conditions of contact are maintained, with the catalyst in fluidized condition.

As is known, the art of fluidization involves the passage of a fluid such as a gaseous reactant upwardly through a bed of solid, powdered contact material at such a rate that the powder becomes uniformly aerated, with the individual particles buoyed up or suspended in the upflowing reactants for random vibratory movement. Thus aerated, the mass of powder assumes an apparent density much below its normal settled density and, with appropriate adjustment of the rate of gas flow, resembles a mass of boiling liquid with high internal turbulence, and an upper pseudo-liquid level from which the fluid reaction products are evolved. Such a fluidized mass, when operating under optimum conditions, is characterized by good temperature uniformity as well as ability to transfer heat to or from adjacent surfaces at a rate analogous to that of good liquid transfer. For this reason, among others, the technique in question finds wide utility in catalytic reactions which are appreciably exothermic or endothermic in character and which, at the same time, require good temperature control.

Among the difficulties which have been experienced, however, is the tendency to form slugs of catalyst with intermediate relatively large bubbles of gas. This and similar departures from desirable uniformity of fluidization throughout the mass of powder, results in imperfect contact between the reactants and the catalyst. Thus under such conditions portions of the reactant may be subjected to actual catalyst contact for varying periods of time in such a manner as to account for the departure from optimum yield often encountered.

While the foregoing may usually be overcome by careful designing of the reactor so that the reactant fluid uniformly distributes itself throughout the powder, by careful control of rate of reactant flow and the like, these conditions are frequently difficult to maintain in actual practice.

It is, accordingly, an object of the present invention to provide for the catalytic conversion of fluid reactants in the presence of a fluidized bed of powdered catalyst under conditions such that the reactants are subjected to contact with the catalyst under more or less uniform predetermined conditions as to time and intimacy of contact.

Another object contemplates the provision of a reactor wherein the catalyst is maintained in a condition of more or less uniform circulation at relatively uniform rates of contact and entrainment with efficient separation of the reaction products from the upper pseudo-liquid level of the catalyst.

A yet further object contemplates overcoming the tendency to form segregated slugs of reactant and catalyst in the reactor by the enhancing of more or less localized increased circulatory turbulence of the catalyst particles such as to overcome any cohesive tendency.

In accordance with the present invention the reaction zone includes a series of scoop or funnel-shaped baffles spaced vertically apart in the line of flow of the fluid reactants and so arranged as to receive a substantial portion of the fluid flow and direct it upwardly through a central aperture in each baffle. At the same time, return passages are provided about the margin of the baffle to permit the catalyst, entrained in the flow through the aforementioned aperture and accumulating above the baffle, to gravitate or return into the space therebelow.

More specifically, the baffles preferably take the form of flow-directing scoops of inverted funnel-like configuration having a recessed lower surface which receives a substantial portion of the reactant flow and funnels it through a central aperture at a substantially increased linear rate of flow. In other words, the funnel shaped configuration of baffle tends to jet the flow as a relatively restricted stream, at a relatively high rate of speed, with substantial entrainment of the catalyst particles. The upper surface of each baffle is preferably convex or upwardly protuberant in form so that the upflowing jet emerges into an open space of substantial relative volume. About the lateral margins of the baffle where the upward rate of flow is relatively less, the entrained catalyst is free to gravitate downwardly into the space below the baffle from which it was jetted.

Obviously, the foregoing results in a uniform internal circulation of the catalyst which is highly advantageous in assuring uniformity of contact with the reactants and free, fluent action of the powdered particles. Another advantage involves an improved uniformity of internal catalyst temperature and accordingly better temperature control in the case of reactions involving the liberation or absorption of thermal energy. Moreover, the pressure drop which may be set up longitudinally through the reactor by the multiplicity of baffles may compensate either entirely, or in large measure for the progressive volume decrease of the reaction fluids encountered in the course of many catalytic reactions. In this connection, reference is made to the well-known process for the synthesis of hydrocarbons by the catalytic reduction of a carbon oxide with hydrogen. While the invention is not so limited, hereinafter in treating more specific illustrations of the present invention, reference will be had to this process by way of example.

In regard to one specific embodiment of the invention presented for purposes of illustration, reference is had to the accompanying drawing wherein:

Fig. 1 is a vertical view with portions broken away showing a section taken through a reactor, represented more or less diagrammatically, embodying the principles of the present invention;

Fig. 2 is an enlarged view taken vertically through one of the catalyst-containing tubes shown in the reactor of Fig. 1;

Fig. 3 is a sectional view taken on the line 3—3 of Fig. 2;

Figs. 4 and 5 are views similar to Fig. 2, illustrating the nature of the internal circulatory action; and Fig. 6 is a perspective view of a modified baffle construction; and Fig. 7 is a sectional view of a yet further modified baffle.

In Fig. 1, the reactor comprises a cylindrical vessel 10 in which a plurality of upstanding reaction tubes 11 are disposed in parallel, vertical relationship, supported by an upper tube sheet 12. Preferably, the extremities of the tubes 11 are belled or expanded as at 13 so that any catalyst powder which may find its way upwardly out of the tubes, will tend to gravitate backwardly thereinto. The top portion of the reactor above the tube sheet comprises a dome-shaped section 14 for receiving fluid reaction product which may be drawn off through a filter 15 and an outlet pipe 16. The filter may comprise, for example, a porous thimble made of Alundum or the like and instead of the single one shown any greater number may be used. Where high temperatures are involved, a refractory material of this character is obviously desirable. On the other hand, any suitable equivalent separating means, such as cyclone separators, electrostatic precipitators and magnetic devices may be substituted in order to separate and return to the reactor the more or less inevitable small amount of entrained catalyst particles.

The lower extremities of the reaction tubes 11 are expanded into a lower tube sheet 19 in substantially the same manner as their upper extremities. A lower dome-shaped section 18 of the reactor 10 provides a distributing chamber receiving the fluid reactants via an inlet pipe 17 from any suitable source not disclosed. Screens 19A at the lower or inlet extremities of the tubes 11 support the masses of catalyst, not shown, in the respective tubes, permitting the fluid reactants to pass upwardly through the catalyst.

Means, including an inlet pipe 20 and an outlet pipe 21, are provided for circulating a coolant fluid through the space about the tubes 11. In short, the reactor comprises a plurality of reaction zones in the form of vertically extending tubes enclosed by a heat transfer jacket maintained at any desired temperature by a flow of coolant.

Referring now in particular to Figs. 2 and 3, each of the tubes 11 is provided with a series of vertically spaced frusto-conical baffles 22 centrally apertured as at 23 and having circumferential outer margins 24. The baffles 22 are supported in spaced relation to the walls of each tube 11 by means of brackets or spacers 25 so that a circumferential passageway exists between the outer margin of each baffle and the inner wall of the tube. In other words, each inverted funnel-like baffle presents its recessed lower surface downwardly to receive the upflow of reactant fluid and funnel it at a relatively high rate of flow through the aperture 23 into the space above the respective baffle. With the several tubes 11 provided with a supply of catalyst as indicated and aerated under an appropriate flow of reactant gases, the apertures 23 operate as a series of jets entraining and blowing the catalyst upwardly into the space between each pair of baffles, with concurrent return of catalyst about the margins of each baffle to the space therebelow, all at coordinated rates such that a condition of substantially uniform and analogous circulation is continuously maintained with respect to each section throughout the vertical extent of tube 11.

Reference is now made to Figs. 4 and 5 in order to explain the operation in accordance with our observations. While such disclosure is helpful in understanding the operation of the present invention, nevertheless, involving as it does expressions of theory, we do not propose to be bound thereby except in respect to the actual results achieved.

Referring more particularly to Fig. 4, the arrows indicate the apparent flow of gases with respect to the internal spaces of the reaction zone. Thus, for example, the lower baffle shown in Fig. 4 receives a substantial proportion at least of the upflowing gaseous stream and funnels it through the central aperture in the form of a relatively high velocity jet. The jet tends to expand somewhat into the open space between the two baffles as indicated by the arrows A and ultimately reaches the upper baffle wherein the same effect is repeated. At the same time, however, the gases in the space about the upflowing jet tend to be entrained and impinge the upper baffle so that a portion at least is redirected downwardly as indicated by the arrows B. These tend to continue their circulation downwardly and be again drawn into the jet A at the region of its emergence from the aperture 23. In other words, the jet obviously to some extent has an injector action characteristic of rapidly flowing streams.

In the meantime, the tendency for fluid flow of the reactants upwardly about the margin of the baffles, as indicated by the arrow C, is counteracted or suppressed substantially by several factors, including the circulatory stream B and the tendency for catalyst to accumulate in the annular recess formed by the protuberant upper surface of the baffles. Stated in another way, the rapidly moving central stream tends to suppress the upward flow of the outer stream C so that catalyst particles may gravitate downwardly at the same overall rate as they are carried upwardly in the rapidly moving stream of reactant.

The catalyst particles entrained in the gases tend to pass upwardly throughout the series of baffles. A portion at least in each of the chambers, or spaces between respective baffles, tends to be diverted outwardly into the upper portion of the circulating gas stream. This resulting change in direction, in a known manner, tends to separate or throw them out of entrainment into the relatively quiescent area between the upper protuberant surface of the baffle and the wall of the tube.

In Fig. 5 the arrows indicate approximately and diagrammatically the path of flow taken by the catalyst particles. As clearly indicated, a portion of the particles remain entrained in the central flow of reactant gases and pass upwardly. A portion, however, of this stream is continuously diverted outwardly as at D, some of the particles gravitating downwardly as at E about the margin of the baffle and others being sucked into the main jet as at F. In any event, both the reactant gases and the catalyst particles tend to follow turbulent paths of movement, such that the type, character and period of catalytic contact remains uniform for any reaction tube where the catalyst is in powdered form and fluidized by an appropriate, selected upflow of reactant fluid.

Fig. 6 discloses a somewhat modified form of baffle provided with elongated slits or apertures 28 which tend to further break up the gaseous flows inside the reaction zone and permit additional agitation and turbulence of the catalyst powder. It is to be understood however that the apertures 28 are advantageously, of sufficiently restricted area so that the funnelling or jetting action of the baffles is not destroyed or impaired to any major extent.

The type of funnel-shaped baffle shown in Fig. 7 is particularly advantageous in maintaining temperature control of exothermic or endothermic reactions. As therein shown, the baffle disposed in reaction vessel 11, is formed of a single spirally or helically wound tube 30, the convolutions of which reside in a funnel shaped zone. The extremities of the tube extend radially of the convolutions as at 31 and 32 and through the walls of the tube thus supporting the baffle in the position shown and providing inlet and outlet means respectively for a suitable flow of coolant.

The convolutions of the tube 30 may be contiguously arranged with adjacent surfaces in contacting relationship to provide a general funnel shape with uninterrupted or impervious walls. On the other hand, it is also advantageous to space the convolutions to a limited extent as shown in Fig. 7, and this spacing may be practiced to any degree which does not, overall, eliminate the above described funnelling effect.

While reference has been made broadly to catalytic processes and to catalysts, it will be obvious that the specific reaction, as well as reaction conditions form no part of the present invention insofar as they involve contact of a fluidized catalyst by a fluid, preferably gaseous or gasiform stream of reactants capable of maintaining the powdered solid in a condition of dense phase fluidization. Thus the invention is applicable to any of the catalytic processes hitherto operated or proposed in connection with a fluidized contact mass. Such, for example, are the process of hydrocarbon cracking, reforming and the like, as well as the hydrocarbon synthesis above mentioned. Obviously, from the above, the catalyst employed will be that conventional for the reaction selected and in the case of hydrocarbon synthesis, for example, may comprise a catalyst of the iron group, such as iron itself, cobalt or ruthenium, either as particles of metal per se or supported or deposited upon a conventional carrier such as diatomaceous earth, alumina, or the like and promoted, if desired by any conventional modifying agent. Particle sizes may be those usually employed in the art, as for example, 100 mesh and finer, preferably 200 mesh and finer. While numerous efforts have been made to express the linear rate of flow in syntheses of this kind, it is believed that such tend to be misleading in a turbulent system. Moreover, optimum rate of flow is readily determined by simply adjusting the rate of reactant introduction until a good condition of uniform turbulence is achieved throughout the length of the reaction zone.

While the invention has been illustrated in connection with one type of reactor wherein separate reaction zones are surrounded by a jacket of transfer fluid, it is pertinent to point out that it is not so limited but is adaptable to any preferred type of reactor. Such, for example, are the single reaction chamber surrounded by a cooling jacket, or the reaction chamber in which the catalyst immerses a multiplicity of vertically extending tubes joined by appropriate upper and lower headers for circulating a thermal heat transfer fluid therethrough. The heat transfer tubes may pass through all of the frusto-conical baffles and the baffles in turn may be welded thereto so that the peripheral lugs or brackets 25 may be omitted. So also it will be evident from the foregoing that the baffles 22 may, per se, provide cooling surfaces by constructing them with spaced walls providing an internal chamber for a thermal transfer fluid which may be circulated through conduits formed in the supporting brackets 25 or by any other appropriate inlet and outlet means.

Reference herein to baffles having the form of an inverted funnel is intended to include all baffles which, when disposed in an upwardly flowing stream of fluid, tend to receive a relatively large transverse part of said flowing stream and funnel or scoop it, as a more rapidly moving stream, through a relatively small orifice or outlet. The lower surface may include any form or shape capable of accomplishing this function and by the term, recessed lower surface, as used herein, we intend all such configurations including concave surfaces, and the like.

Obviously, many other modifications and variations of the present invention as hereinbefore set forth may be made without departing from the spirit and scope thereof, and therefore only such limitations should be imposed as are contained in the appended claims.

We claim:

1. In the catalytic conversion of gaseous reactants into desired products of reaction wherein the gaseous reactants are passed upwardly through a mass of solid particle catalyst in a vertically extending reaction zone at a linear rate such that the catalyst particles are maintained in a dense fluid phase condition, the improvement which comprises subjecting the upflowing reactant stream at each of a plurality of vertically spaced points in the reaction zone to directed flow which includes funneling the central portion of the stream of reactants into an upflowing central jet of substantially increased velocity while permitting the surrounding peripheral portions of said reactant stream to flow continuously upwardly against gravitating particles of catalyst, and discharging both of said portions of the reactants into a common zone of relatively reduced flow, thereby to overcome irregularity of contact between the reactants and the catalyst.

2. The process according to claim 1 wherein the gaseous reactants comprise hydrogen and carbon monoxide, and the catalyst comprises a hydrocarbon synthesis catalyst maintained at an elevated temperature at which the reactants are converted into hydrocarbons, oxygenated hydrocarbons or mixtures thereof.

3. In the catalytic conversion of gaseous reactants into desired products of reaction wherein the gaseous reactants are passed upwardly through a mass of solid particle catalyst in a vertically extending reaction zone at a linear rate such that the catalyst particles are maintained in a dense fluid phase condition, the improvement which comprises maintaining predetermined regularity of contact between the catalyst and the reactants by subjecting the central portion of the upflowing stream of reactants at each of a plurality of vertically spaced points within the reaction zone to contact with a baffle of inverted funnel shape, effective to discharge reactants upwardly as a jet of substantially increased velocity, permitting the surrounding peripheral portions of said reactant stream about said baffle to flow continuously upwardly and discharging both of said portions beyond said baffle into a common zone of reduced flow.

4. The process according to claim 3 in which the gaseous reactants comprise hydrogen and carbon monoxide and the catalyst comprises a hydrocarbon synthesis catalyst maintained at a temperature at which the reactants are converted into hydrocarbons, oxygenated hydrocarbons, or mixtures thereof.

5. In a fluid catalytic reactor comprising a vertically extending reaction chamber adapted to receive a mass of fluidized powdered catalyst, means for introducing a fluid reactant into the lower portion of the chamber to flow upwardly through the mass of powdered catalyst and an outlet at the upper portion of the chamber for withdrawing reaction products after contact with the catalyst, a baffle arranged in said chamber and comprising a helically wound, tubular member having closely arranged convolutions disposed in the form of an inverted funnel having a centrally located aperture for directing reactant fluid upwardly and centrally of the chamber, and means for continuously passing a heat transfer fluid through the said tube to effect temperature regulation within the chamber.

6. In the catalytic conversion of hydrogen and carbon oxide into desired products of reaction comprising hydrocarbons wherein the gaseous reactants are passed upwardly through a mass of solid particle catalyst in a vertically extending reaction zone containing a plurality of spaced, vertically extending cooling tubes, at a linear rate such that the catalyst particles are maintained in a dense fluid phase condition, the improvement which comprises subjecting the upflowing reactant stream comprising hydrogen and carbon oxide at each of a plurality of vertically spaced points in the reaction zone to directed flow which includes funneling laterally spaced, separate portions of the stream of reactants into upflowing jets of substantially increased velocity while permitting unfunneled adjacent portions of said reactant stream to flow continuously upwardly against gravitating particles of catalyst, and discharging said funneled and unfunneled portions of the reactant stream into a common zone of relatively reduced flow, thereby to overcome irregularity of contact between the reactants and the catalyst.

ROLAND A. BECK.
EUGENE E. SENSEL.

REFERENCES CITED

The following references are of record in the file of this patent:

FOREIGN PATENTS

| Number | Country | Date |
|--------|---------|------|
| 541,734 | Great Britain | Dec. 9, 1941 |
| 558,879 | Great Britain | Jan. 26, 1944 |